United States Patent
Lee et al.

(10) Patent No.: US 7,346,069 B2
(45) Date of Patent: Mar. 18, 2008

(54) APPARATUS AND METHOD FOR DYNAMIC RESOURCE ALLOCATION IN INTERACTIVE SATELLITE MULTIMEDIA SYSTEM

(75) Inventors: Ki-Dong Lee, Seoul (KR); Yong Hoon Cho, Daejon (KR); Ho Jin Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 939 days.

(21) Appl. No.: 10/625,209

(22) Filed: Jul. 22, 2003

(65) Prior Publication Data

US 2004/0125784 A1  Jul. 1, 2004

(30) Foreign Application Priority Data

Dec. 11, 2002  (KR) .................. 10-2002-0078827

(51) Int. Cl.
*H04L 12/28* (2006.01)
(52) U.S. Cl. .................. 370/431; 370/316; 370/328; 370/437
(58) Field of Classification Search ................ 370/310, 370/316, 319–322, 328, 395.1, 395.21, 395.4, 370/395.41, 395.42, 431, 437; 455/12.1, 455/427, 430
See application file for complete search history.

(56) References Cited

U.S. PATENT DOCUMENTS 5,363,374 A    11/1994   Zein
5,732,076 A *   3/1998   Ketseoglou et al. ........ 370/347
5,812,545 A    9/1998   Liebowitz et al.
6,130,886 A *   10/2000   Ketseoglou et al. ........ 370/347
6,370,117 B1   4/2002   Koraitim et al.
6,449,267 B1   9/2002   Connors

FOREIGN PATENT DOCUMENTS

KR    1998-033158    7/1998

OTHER PUBLICATIONS

European Journal of Operational Research, "An integer programming approach to the time slot assignment problem in SS/TDMA systems with intersatellite links", T. Lee, et al., pp. 57-66, 2001.
International Journal of Satellite Communications, Time Slot Assignment in a Heterogeneous Environment of a SS/TDMA System, pp. 197-203, 1992.

* cited by examiner

*Primary Examiner*—Wing Chan
*Assistant Examiner*—Mark A. Mais
(74) *Attorney, Agent, or Firm*—Blakely Sokoloff Taylor & Zafman (57) ABSTRACT

A dynamic resource allocation apparatus and method for assigning timeslot in a return channel in multi-frequency time division multiple access MF-TDMA in order to have a maximum throughput is disclosed. The apparatus includes: resource request amount collection unit for accumulating a requested resource amount corresponding to each of terminals during a super-frame period; resource request amount processing unit for dividing an accumulated requested resource amount by the number of frame pairs in a super frame and storing a sum of a result of dividing and rounding up a remain of the division to a nearest integer as a request amount of each corresponding terminal; and resource allocation unit for deciding a time slot allocated at each of terminals corresponding to a frame pair based on optimal allocation amount, which is decided based on the request amount by the requested amount processing unit.

11 Claims, 8 Drawing Sheets

```
allocation amount
  0:  13    1:  14    2:  14    3:  14    4:  15    5:  15    6:  15    7:  15
  8:  16    9:  16   10:  16   11:  16   12:  17   13:  17   14:  17   15:  18
 16:  18   17:  18   18:  18   19:  19   20:  19   21:  19   22:  20   23:  20
 24:  20   25:  20   26:  21   27:  21   28:  21   29:  22   30:  22   31:  22
 32:  22   33:  23   34:  23   35:  23   36:  24   37:  24   38:  24   39:  24
 40:  25   41:  25   42:  25   43:  25   44:  26   45:  26   46:  26   47:  27
 48:  27   49:  27   50:  27   51:  28   52:  28   53:  28   54:  29   55:  29
 56:  29   57:  29   58:  30   59:  30   60:  30   61:  31   62:  31   63:  31
 64:  31   65:  32   66:  32   67:  32   68:  33   69:  33   70:  33   71:  33
 72:  34   73:  34   74:  34   75:  34   76:  35   77:  35   78:  35   79:  36
 80:  36   81:  36   82:  36   83:  37   84:  37   85:  37   86:  38   87:  38
 88:  38   89:  38   90:  39   91:  39   92:  39   93:  40   94:  40   95:  40
 96:  40   97:  41   98:  41   99:  41  100:  42  101:  42  102:  42  103:  42
104:  43  105:  43  106:  43  107:  43  108:  44  109:  44  110:  44  111:  45
112:  45  113:  45  114:  45  115:  46  116:  46  117:  46  118:  47  119:  47
120:  47  121:  47  122:  48  123:  48  124:  48  125:  49  126:  49  127:  49
```

FIG. 5B

Phase I: 10.000 msec at (level) 128 RCSTs

```
Id:  0, frame: 0 startslot:   3, repeat: 12 amount: 13
Id:  1, frame: 0 startslot:  16, repeat: 13 amount: 14
Id:  2, frame: 0 startslot:  30, repeat: 13 amount: 14
Id:  3, frame: 0 startslot:  44, repeat: 13 amount: 14
Id:  4, frame: 0 startslot:  58, repeat: 14 amount: 15
Id:  5, frame: 0 startslot:  73, repeat: 14 amount: 15
Id:  6, frame: 0 startslot:  88, repeat: 14 amount: 15
Id:  7, frame: 0 startslot: 103, repeat: 14 amount: 15
Id:  8, frame: 0 startslot: 118, repeat: 15 amount: 16
Id:  9, frame: 0 startslot: 134, repeat: 15 amount: 16
Id: 10, frame: 0 startslot: 150, repeat: 15 amount: 16
Id: 11, frame: 0 startslot: 166, repeat: 15 amount: 16
Id: 12, frame: 0 startslot: 182, repeat: 16 amount: 17
Id: 13, frame: 0 startslot: 199, repeat: 16 amount: 17
Id: 14, frame: 0 startslot: 216, repeat: 16 amount: 17
Id: 15, frame: 0 startslot: 233, repeat: 17 amount: 18
Id: 16, frame: 0 startslot: 251, repeat: 17 amount: 18
Id: 17, frame: 0 startslot: 269, repeat: 17 amount: 18
Id: 18, frame: 0 startslot: 287, repeat: 17 amount: 18
Id: 19, frame: 0 startslot: 305, repeat: 18 amount: 19
Id: 20, frame: 0 startslot: 324, repeat: 18 amount: 19
Id: 21, frame: 0 startslot: 343, repeat: 18 amount: 19
Id: 22, frame: 0 startslot: 362, repeat: 19 amount: 20
Id: 23, frame: 0 startslot: 382, repeat: 19 amount: 20
Id: 24, frame: 0 startslot: 402, repeat: 19 amount: 20
Id: 25, frame: 0 startslot: 422, repeat: 19 amount: 20
Id: 26, frame: 0 startslot: 442, repeat: 20 amount: 21
Id: 27, frame: 0 startslot: 463, repeat: 20 amount: 21
Id: 28, frame: 0 startslot: 484, repeat: 20 amount: 21
Id: 29, frame: 0 startslot: 505, repeat:  5 amount: 22
Id: 29, frame: 0 startslot: 514, repeat: 15 amount: 22
Id: 30, frame: 0 startslot: 530, repeat: 21 amount: 22
Id: 31, frame: 0 startslot: 552, repeat: 21 amount: 22
Id: 32, frame: 0 startslot: 574, repeat: 21 amount: 22
Id: 33, frame: 0 startslot: 596, repeat: 22 amount: 23
Id: 34, frame: 0 startslot: 619, repeat: 22 amount: 23
Id: 35, frame: 0 startslot: 642, repeat: 22 amount: 23
Id: 36, frame: 0 startslot: 665, repeat: 23 amount: 24
Id: 37, frame: 0 startslot: 689, repeat: 23 amount: 24
Id: 38, frame: 0 startslot: 713, repeat: 23 amount: 24
Id: 39, frame: 0 startslot: 737, repeat: 23 amount: 24
Id: 40, frame: 0 startslot: 761, repeat: 24 amount: 25
Id: 41, frame: 0 startslot: 786, repeat: 24 amount: 25
Id: 42, frame: 0 startslot: 811, repeat: 24 amount: 25
Id: 43, frame: 0 startslot: 836, repeat: 24 amount: 25
Id: 44, frame: 0 startslot: 861, repeat: 25 amount: 26
Id: 45, frame: 0 startslot: 887, repeat: 25 amount: 26
Id: 46, frame: 0 startslot: 913, repeat: 25 amount: 26
Id: 47, frame: 0 startslot: 939, repeat: 26 amount: 27
Id: 48, frame: 0 startslot: 966, repeat: 26 amount: 27
```

FIG. 5C

```
Id: 49, frame:  0 startslot:  993, repeat: 26 amount: 27
Id: 50, frame:  0 startslot: 1020, repeat:  1 amount: 27
Id: 50, frame:  0 startslot: 1025, repeat: 24 amount: 27
Id: 51, frame:  0 startslot: 1050, repeat: 27 amount: 28
Id: 52, frame:  0 startslot: 1078, repeat: 27 amount: 28
Id: 53, frame:  0 startslot: 1106, repeat: 27 amount: 28
Id: 54, frame:  0 startslot: 1134, repeat: 28 amount: 29
Id: 55, frame:  0 startslot: 1163, repeat: 28 amount: 29
Id: 56, frame:  0 startslot: 1192, repeat: 28 amount: 29
Id: 57, frame:  0 startslot: 1221, repeat: 28 amount: 29
Id: 58, frame:  0 startslot: 1250, repeat: 29 amount: 30
Id: 59, frame:  0 startslot: 1280, repeat: 29 amount: 30
Id: 60, frame:  0 startslot: 1310, repeat: 29 amount: 30
Id: 61, frame:  0 startslot: 1340, repeat: 30 amount: 31
Id: 62, frame:  0 startslot: 1371, repeat: 30 amount: 31
Id: 63, frame:  0 startslot: 1402, repeat: 30 amount: 31
Id: 64, frame:  0 startslot: 1433, repeat: 30 amount: 31
Id: 65, frame:  0 startslot: 1464, repeat: 31 amount: 32
Id: 66, frame:  0 startslot: 1496, repeat: 31 amount: 32
Id: 67, frame:  0 startslot: 1528, repeat:  4 amount: 32
Id: 67, frame:  0 startslot: 1536, repeat: 26 amount: 32
Id: 68, frame:  0 startslot: 1563, repeat: 32 amount: 33
Id: 69, frame:  0 startslot: 1596, repeat: 32 amount: 33
Id: 70, frame:  0 startslot: 1629, repeat: 32 amount: 33
Id: 71, frame:  0 startslot: 1662, repeat: 32 amount: 33
Id: 72, frame:  0 startslot: 1695, repeat: 33 amount: 34
Id: 73, frame:  0 startslot: 1729, repeat: 33 amount: 34
Id: 74, frame:  0 startslot: 1763, repeat: 33 amount: 34
Id: 75, frame:  0 startslot: 1797, repeat: 33 amount: 34
Id: 76, frame:  0 startslot: 1831, repeat: 34 amount: 35
Id: 77, frame:  0 startslot: 1866, repeat: 34 amount: 35
Id: 78, frame:  0 startslot: 1901, repeat: 34 amount: 35
Id: 79, frame:  0 startslot: 1936, repeat: 35 amount: 36
Id: 80, frame:  0 startslot: 1972, repeat: 35 amount: 36
Id: 81, frame:  0 startslot: 2008, repeat: 35 amount: 36
Id: 82, frame: 16 startslot:    3, repeat: 35 amount: 36
Id: 83, frame: 16 startslot:   39, repeat: 36 amount: 37
Id: 84, frame: 16 startslot:   76, repeat: 36 amount: 37
Id: 85, frame: 16 startslot:  113, repeat: 36 amount: 37
Id: 86, frame: 16 startslot:  150, repeat: 37 amount: 38
Id: 87, frame: 16 startslot:  188, repeat: 37 amount: 38
Id: 88, frame: 16 startslot:  226, repeat: 37 amount: 38
Id: 89, frame: 16 startslot:  264, repeat: 37 amount: 38
Id: 90, frame: 16 startslot:  302, repeat: 38 amount: 39
Id: 91, frame: 16 startslot:  341, repeat: 38 amount: 39
Id: 92, frame: 16 startslot:  380, repeat: 38 amount: 39
Id: 93, frame: 16 startslot:  419, repeat: 39 amount: 40
Id: 94, frame: 16 startslot:  459, repeat: 39 amount: 40
Id: 95, frame: 16 startslot:  499, repeat: 11 amount: 40
Id: 95, frame: 16 startslot:  514, repeat: 27 amount: 40
Id: 96, frame: 16 startslot:  542, repeat: 39 amount: 40
```

FIG. 5D

```
Id: 97, frame: 16 startslot:  582, repeat: 40 amount: 41
Id: 98, frame: 16 startslot:  623, repeat: 40 amount: 41
Id: 99, frame: 16 startslot:  664, repeat: 40 amount: 41
Id:100, frame: 16 startslot:  705, repeat: 41 amount: 42
Id:101, frame: 16 startslot:  747, repeat: 41 amount: 42
Id:102, frame: 16 startslot:  789, repeat: 41 amount: 42
Id:103, frame: 16 startslot:  831, repeat: 41 amount: 42
Id:104, frame: 16 startslot:  873, repeat: 42 amount: 43
Id:105, frame: 16 startslot:  916, repeat: 42 amount: 43
Id:106, frame: 16 startslot:  959, repeat: 42 amount: 43
Id:107, frame: 16 startslot: 1002, repeat: 19 amount: 43
Id:107, frame: 16 startslot: 1025, repeat: 22 amount: 43
Id:108, frame: 16 startslot: 1048, repeat: 43 amount: 44
Id:109, frame: 16 startslot: 1092, repeat: 43 amount: 44
Id:110, frame: 16 startslot: 1136, repeat: 43 amount: 44
Id:111, frame: 16 startslot: 1180, repeat: 44 amount: 45
Id:112, frame: 16 startslot: 1225, repeat: 44 amount: 45
Id:113, frame: 16 startslot: 1270, repeat: 44 amount: 45
Id:114, frame: 16 startslot: 1315, repeat: 44 amount: 45
Id:115, frame: 16 startslot: 1360, repeat: 45 amount: 46
Id:116, frame: 16 startslot: 1406, repeat: 45 amount: 46
Id:117, frame: 16 startslot: 1452, repeat: 45 amount: 46
Id:118, frame: 16 startslot: 1498, repeat: 34 amount: 47
Id:118, frame: 16 startslot: 1536, repeat: 11 amount: 47
Id:119, frame: 16 startslot: 1548, repeat: 46 amount: 47
Id:120, frame: 16 startslot: 1595, repeat: 46 amount: 47
Id:121, frame: 16 startslot: 1642, repeat: 46 amount: 47
Id:122, frame: 16 startslot: 1689, repeat: 47 amount: 48
Id:123, frame: 16 startslot: 1737, repeat: 47 amount: 48
Id:124, frame: 16 startslot: 1785, repeat: 47 amount: 48
Id:125, frame: 16 startslot: 1833, repeat: 48 amount: 49
Id:126, frame: 16 startslot: 1882, repeat: 48 amount: 49
Id:127, frame: 16 startslot: 1931, repeat: 48 amount: 49
Phase II: 30.000 msec at 128 RCSTs
```

APPARATUS AND METHOD FOR DYNAMIC RESOURCE ALLOCATION IN INTERACTIVE SATELLITE MULTIMEDIA SYSTEM

FIELD OF THE INVENTION

The present invention relates to an apparatus and method for resource allocation in interactive satellite multimedia system; and, more particularly, to a dynamic resource allocation apparatus and method for assigning timeslot in a return channel in multi-frequency time division multiple access (MF-TDMA) in order to have a maximum throughput.

DESCRIPTION OF RELATED ARTS

There have been various apparatus and methods developed for resource allocation in a time division multiple accesses (TDMA) such as a timeslot assignment method in inter-satellite links and a resource allocation method in TDMA in mobile communication system.

Inhere, a resource represents a frequency bandwidth used at a return link, which is a link between a return channel satellite terminals (RCSTs) to a satellite. That is, the resource is a set of timeslots in the return link in multi-frequency time division multiple access MF-TDMA. In MF-TDMA, resources are allocated as a unit of a frame or a super-frame. One frame includes a plurality of timeslots and one super-frame includes a plurality of frames.

An interactive satellite multimedia system is a satellite network with one earth station (HUB) and a plurality of terminals called return channel satellite terminals (RCST). The earth station (HUB) receives a request of service through satellites and provides services to terminals (RCST) through the satellite by responding to the request. In the satellite communication system, since the radio resources are very expensive comparing to those in land mobile communication systems, it is one of the most important problems to maximize the link throughput using the limited available resources.

Specially, in the interactive satellite communication system having a centralized resource management function in the earth station (Hub), the resource needs to be allocated by considering round-trip time (RTT) spending for requesting the resource from the terminal (RCST) to the earth station (Hub) and receiving an assignment plane from the earth station (Hub) to terminal station (RCST). In a view of allocating resource by considering RTT, the resource allocation method in the interactive satellite communication system is distinguished from the conventional technique for allocating resources in the satellite communication.

Furthermore, comparing to a timeslot assignment scheduling and packet assignment scheduling of a mobile communication system, it is also distinguished in view of delay of transmission and a bandwidth of frequency is comparatively broadband. In broadband TDMA, the length of each timeslot is usually much shorter than that in a narrow- or medium-band TDMA. As a result, the scheduling period is getting short or the number of timeslots per a scheduling period is getting great, both of which make a fast timeslot scheduling more difficult, especially in such an interactive satellite network having an intrinsic round trip time between capacity request and allocation.

As a result, it is preferred to have as short period of scheduling time as possible in order to minimize the negative effect of the RTT.

In the interactive satellite multimedia system, therefore, it is essential that a method for reapidly and dynamically outputting a resource allocation plan to capacity request from a plurality of terminals (RCSTs).

SUMMARY OF THE INVENTION

It is, therefore, an object of the present invention to provide an apparatus and method for rapidly generating a dynamic resource allocation schedule in order to maximize throughput in a return link based on MF-TDMA of an interactive multimedia network.

In accordance with an aspect of the present invention, there is provided an apparatus for dynamically allocating resource in an interactive satellite multimedia system, including: resource request amount collection unit for accumulating a requested resource amount corresponding to each of terminals during a super-frame period; resource request amount processing unit for dividing an accumulated requested resource amount by the number of frame pairs in a super frame and storing a sum of a result of dividing and rounding up a remain of the division to a nearest integer as a request amount of each corresponding terminal; and resource allocation unit for deciding a time slot allocated at each of terminals corresponding to a frame pair based on optimal allocation amount, which is decided based on the request amount by the requested amount processing unit.

In accordance with an aspect of the present invention, there is also provided a method for dynamically allocating resources in an interactive satellite multimedia system, including the steps of: a) accumulating a request amount of resource corresponding to each of terminals during a super-frame period; b) dividing the accumulated request amount of resource by the number of frame pairs included in one super frame and remembering a sum of a result of dividing and rounding off a remain of the division to a nearest integer as a resource request amount; and c) deciding an optimal allocation amount based on the resource request amount and deciding a time slot to be allocated to each of terminals based on the optimal allocation amount.

In accordance with an aspect of the present invention, there is also provided a computer readable recording medium storing instructions for executing a method for actively allocation resource in two-way satellite multimedia system, including functions of: a) accumulating a request amount of resource corresponding to each of terminals during a super-frame period; b) dividing the accumulated request amount of resource by the number of frame pairs included in one super frame and remembering a sum of a result of dividing and rounding off a remain of the division to a nearest integer as a resource request amount; and c) deciding an optimal allocation amount based on the resource request amount and deciding a time slot to be allocated to each of terminals based on the optimal allocation amount.

BRIEF DESCRIPTION OF THE DRAWINGS(S)

The above and other objects and features of the present invention will become apparent from the following description of the preferred embodiments given in conjunction with the accompanying drawings, in which:

FIGS. 5A to 5D show results of extensive simulation of a preferred embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
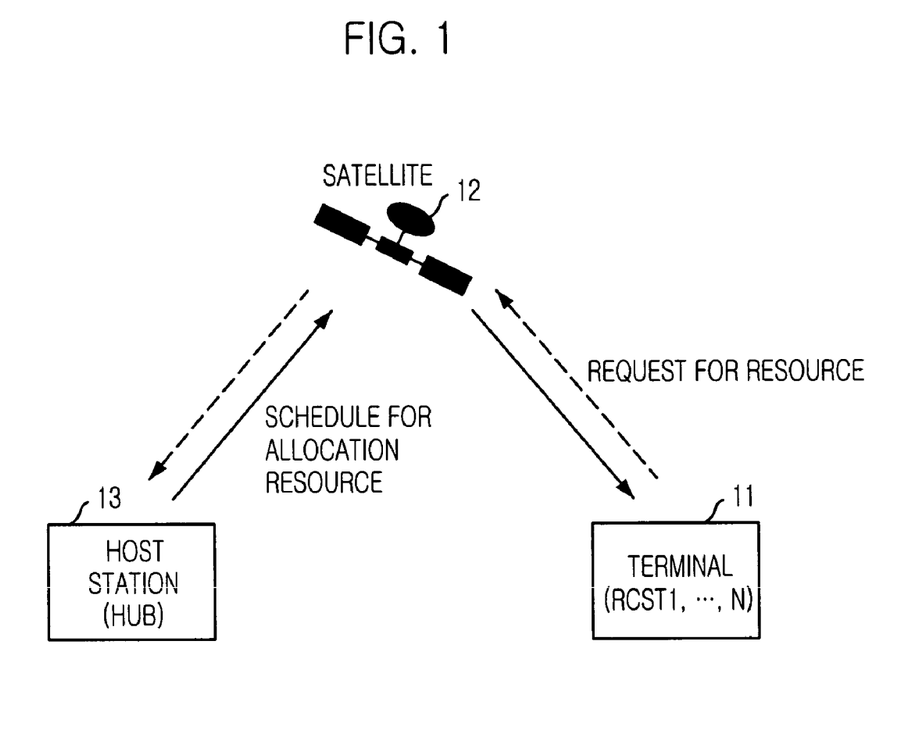
FIG. 1 is a diagram showing a conventional interactive satellite multimedia system.

FIG. 1 is a view representing a conventional interactive satellite multimedia system.

Referring to FIG. 1, the conventional interactive satellite multimedia system includes a plurality of terminals 11, a satellite 12 and a host station (HUB) 13. The terminals 11 send a request for resource to the host station 13 through the satellite 12. The host station 13 provides services to the terminals 13 through the satellite 12. In the interactive satellite multimedia system, it is one of the most important problems to maximize a throughput according to the user's traffic.

In FIG. 1, there is only one host station and one satellite however, it is possible to include multiple host stations and satellites in the satellite communication network.

The multiple terminals 11 simultaneously request resources to the host station 13 and each of terminals uses only allocated resource (timeslot).

The host station 13 receives and analyzes requests for resources from the multiple terminals and decides appropriate number of timeslots to assign to each of terminals according to analysis. The decision of the host station is reported to each of terminals through the satellite 12.

The host station includes an algorithm for computing a dynamic resource allocation schedule in order to maximize the throughput of a return link between the terminal 11 to the satellite 12. The host station receives requests for resource of frequency from the terminals 11 and rapidly computes the dynamic resource allocation schedule. At this time, a requested resource for a frequency is a frequency bandwidth used for a return link between the terminal 11 and the satellite 12. That is, the requested resource for frequency is a set of a certain number of timeslots in the return link based on MF-TDMA. For rapidly computing a schedule for allocation resources at each of superframes, the present invention needs to improve the computational efficiency of timeslot scheduling by employing the so-called problem reduction and decomposition technique, where we separately consider how to decide an amount of allocation according to each of terminals and how to select timeslot for allocating to each of terminals.

By using a problem decomposition method, the amount of computation can be decreased and the speed of computation can be improved.

Figure 2:
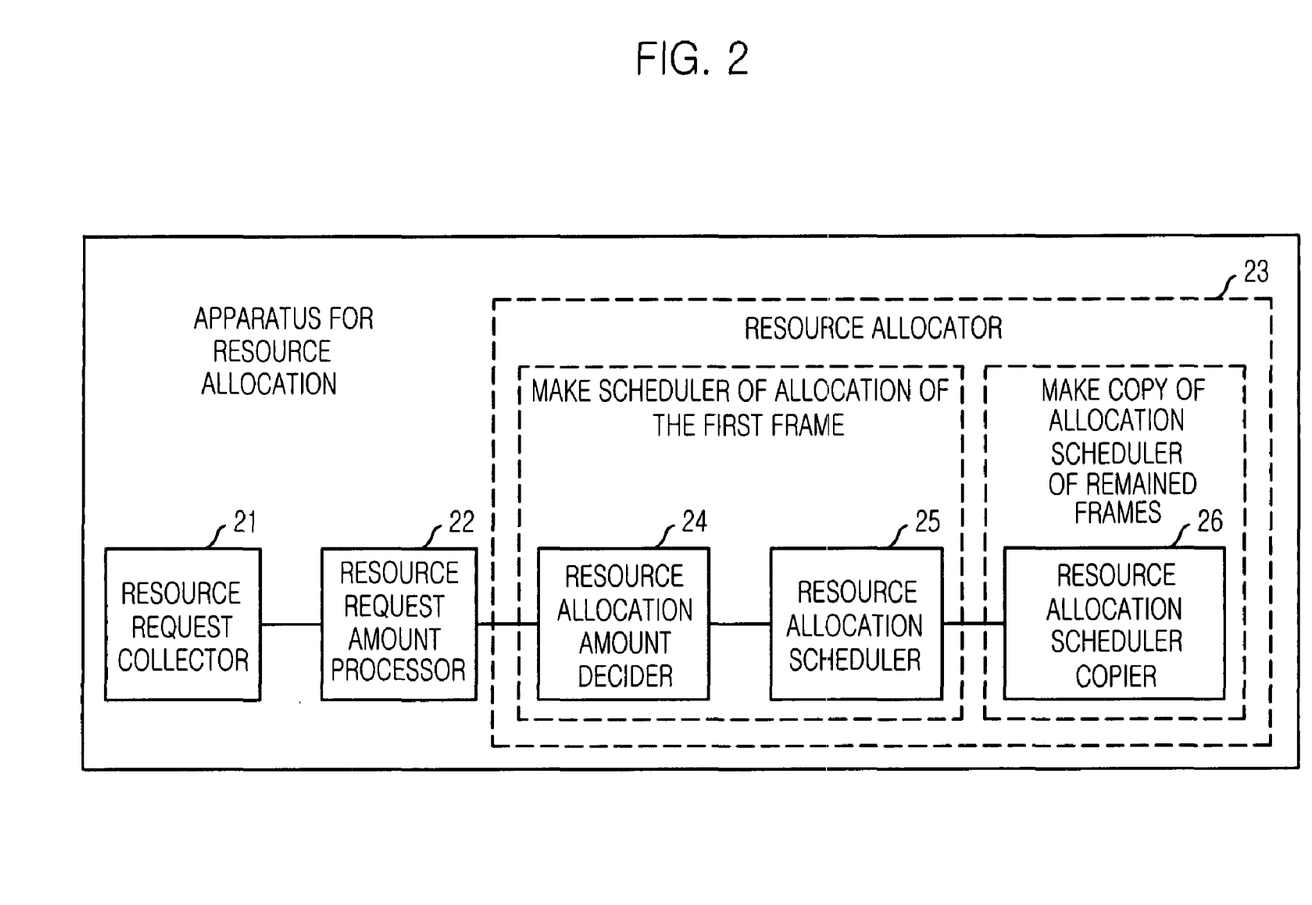
FIG. 2 is a block diagram depicting a dynamic resource allocation apparatus in accordance with a preferred embodiment of the present invention.

FIG. 2 is a diagram showing a dynamic resource allocator for dynamically allocating resources in accordance with a preferred embodiment of the present invention.

Referring to FIG. 2, the dynamic resource allocator in the host station (Hub) includes a resource request collector 21, a resource request amount processor 22 for computing an amount of resources for allocation by dividing collected request amount to the number of frame pairs and rounding off a result of division to nearest integer number, a resource allocation amount decider 24, a resource allocation scheduler 25 and a resource allocation schedule copier 26.

That is, for scheduling the resource of the first frame pair, the resource allocation decider 24 decides the optimal amount for each frame pair by considering how many frames are allocated to each of terminals 11. The resource allocation scheduler 25 makes a schedule based on the optimal amount of allocation and selects one of terminal to be assigned to allocated resource. The resource allocation schedule copier 26 copies allocation schedule of the first frame pair to remained frame pairs in the same superframe.

Referring to FIG. 2, the dynamic resource allocator used for the host station 13 includes a resource request collector 21 for accumulating an amount of request for resource during a superframe period, a resource request amount processor 22 for computing a requested resource amount by dividing collected request amount to the number of frame pairs in one of superframe and adding the result of dividing and rounding off a remain of division to nearest integer number and a resource allocator 23 for deciding an optimal amount of allocation based on the request amount of the request amount processor 22 and deciding a timeslot to be assigned to each of terminals 11 according to the frame pairs based on the optimal amount of allocation.

The resource allocator 23 has a resource allocation amount decider 24 for deciding the optimal amount based on processed request amount in the resource request processor 22, a resource allocation scheduler 25 for selecting and deciding one of terminals RCST 11 to be allocated of a timeslot included in the first frame pair based on the optimal allocation amount and a resource allocation scheduler copier 26 for copying timeslot allocation schedule of the first frame pair to remained frame pairs in the same superframe.

The resource request collector 21 accumulates a requested resource amount generated during the superframe according to each of terminals RCST and reports it to the resource request amount processor 22. After reporting, the accumulated amount is set to 0 and the resource request collector 21 starts to accumulate the requested resource amount with next superframe.

The resource request amount processor 22 computes an optimal amount of allocation by dividing a resource request amount of each of terminals RCST 11 to the number of frame pairs and rounding off a result of division to the nearest integer number and the resource allocation decider 24 decides the optimal allocation amount according to priorities such as cost and weight.

The resource allocation scheduler 25 decides terminals according to each timeslot included in the first frame pair based on the optimized allocation amount.

The resource allocation schedule copier 26 copies schedule of resource allocation including a timeslot allocation schedule from the resource allocation scheduler 25 assigned to the first frame pair to remained frame pairs in same super-frame.

Figure 3:
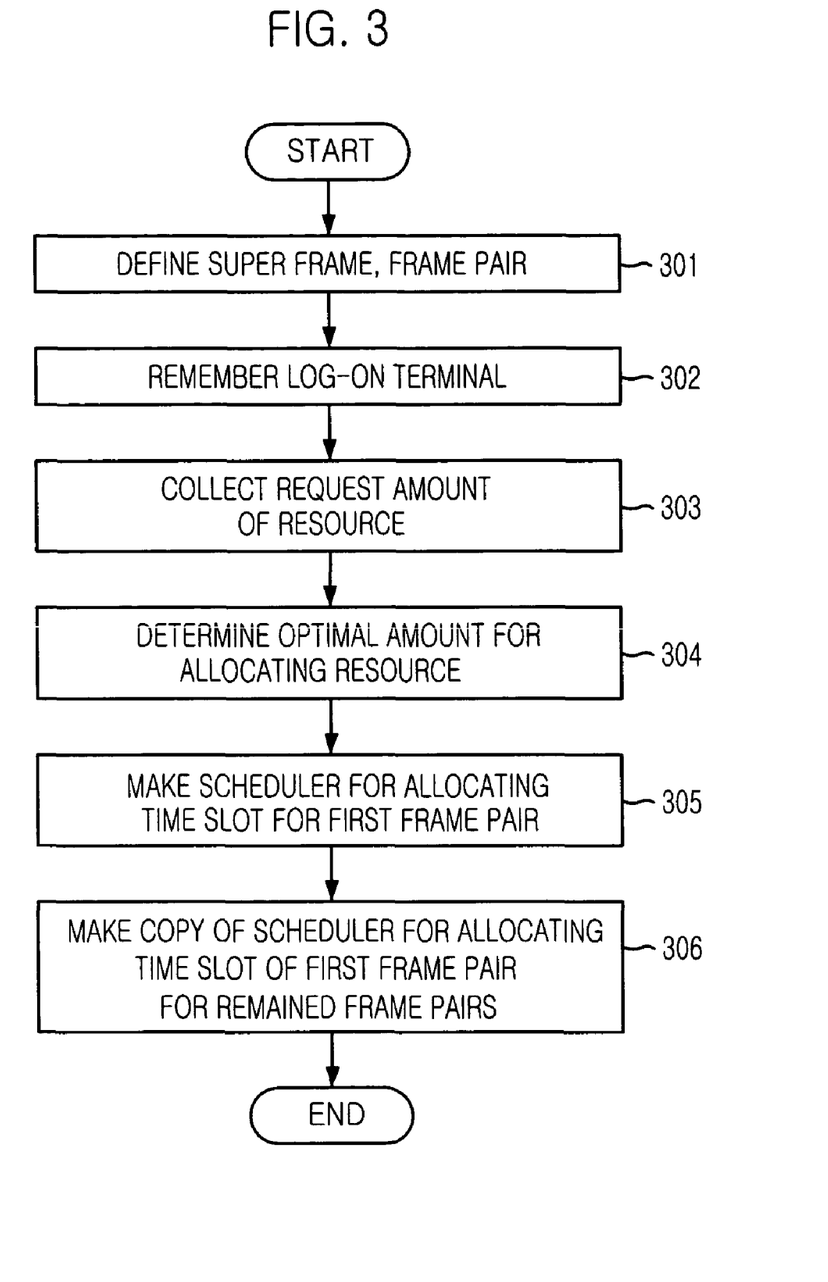
FIG. 3 is a flowchart for explaining a dynamic resource allocation method in accordance with a preferred embodiment of the present invention.

FIG. 3 is a flowchart explaining dynamic resource allocation method in accordance with a preferred embodiment of the present invention.

At first, a unit of resource allocation according to a schedule is defined at step of 301. That is, a super-frame and frame pair are defined.

In MF-TDMA, the schedule for allocation is established based on a unit of frame in the superframe and one super-frame includes a plurality of frames.

A frame pair is a subset of the superframe and it is satisfied by below conditions.

A frame pair is a set of frame having identical time period. Each of frame pairs has same arranging type of time slot and a frequency bandwidth and only difference between frame pairs is the time period. Therefore, all frame pair is a subset of the super-frame and a sum of all frame pairs defined in a given superframe constitutes a superframe.

Figure 4:
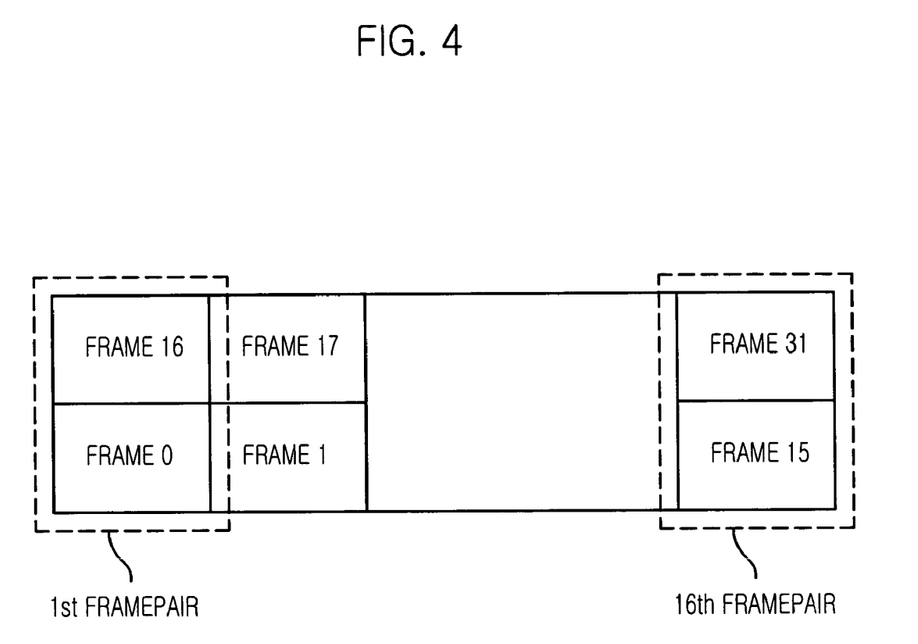
FIG. 4 is a diagram showing a structure of a super-frame in accordance with a preferred embodiment of the present invention.
Figure 5A:
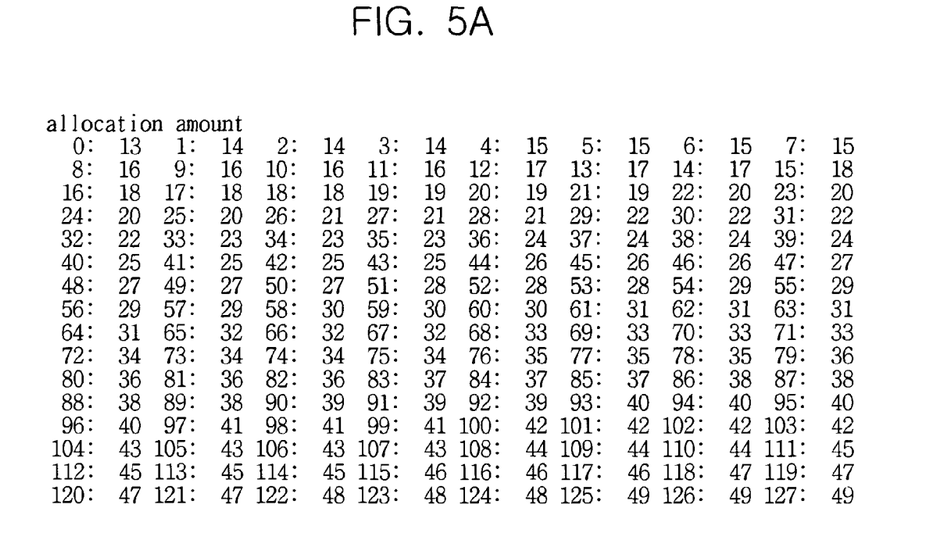

For example, in case of the superframe having 32 frames as shown in FIG. 4, there are 16 frame pairs by pairing frame 0 and frame 16 as a one frame pair and so on.

After defining the frame pair or superframe, the resource request amount collector 21 remembers an ID of terminals, which are logged on at step of 302, and accumulated request amount during one super-frame length is stored at step of 303. At the step of 303, the request amount is updated. The accumulated request amount of each terminal is computed by dividing the accumulated request amount to the number of frame pairs in one super-frame and adding the result of division and rounding up the remain of the division to nearest integer number. A small difference will be ignored since each request amount is reputedly allocated as many as the number of frame pairs.

Next, the resource allocation decider 23 computes the optimal allocation amount based on request amount at step of 304 and the resource allocation scheduler 25. The resource allocation copier 26 decides timeslots for allocation to each terminal according to frame pair based on the optimal allocation amount at step of 305 and 306.

At step of 305, the resource allocation scheduler 25 decides all time slots including the first frame pair to assign to which a terminal (RCST) 11. At step of 306, a time slot allocation schedule of the first frame pair is copied to remained frame pairs in the identical super-frame by the resource allocation schedule copier 26.

For example, in case of the super-frame including 32 frames, as shown in FIG. 4, an algorithm of equations 4 and 5 is applied for deciding to allocate a time slot to a first frame pair by generating a resource allocation schedule and for other frame pairs, the timeslots are allocated by copying the resource allocation schedule for the first frame pair. The above mentioned method for deciding the assignment of each time slot can reduce calculation steps and processing time. For example, if there are 2000 time slots in a frame, 2000×2 times of calculations for the first frame are required. That is, there are 4000 allocation schedules required and the other frame pairs use the computed allocation schedule for the first frame. However, if allocation schedules for all frame need to be calculated then there are 64000 allocation schedules required.

Hereinafter, a step of 304 for deciding optimal allocation amount decision of the first frame pair in the identical superframe and a step of 305 for rapidly allocating time slot based on the optimal allocation amount are explained in detail.

At first, it is explained that the optimal allocation amount based on an accumulated during a length of the superframe received from the terminals (RCST) 11, which is logged on.

Below equation shows original problem for dynamic allocation of time slots.

(CAP)

$$\text{MINIMIZE } g(x) = \sum_{j \in R} \left[ v_i \sum_{m \in A} \sum_{i \in S} (1 - x_{ij}) \right]$$

subject to $$\sum_{m \in A} \sum_{j \in s} x_{ij} \leq \min\{Q_j, X_j + Y_i\}, j \in R \quad \text{Eq. 1}$$

$$\sum_{m \in A} \sum_{j \in s} x_{ij} \geq Y_j, j \in R$$

$$\sum_{j \in R} x_{ji} \leq 1, j \in S_m, m \in A$$

$$x_{ji} \in \{0, 1\}$$

In Eq. 1, i is $i^{th}$ time slot, j is $j^{th}$ terminal and R is a set of IDs of terminals logged on. A is a set of ID of return link demodulators, which are available. $S_n$ is a set of IDs of available time slots and $Q_j$ is the maximum number of time slots, which can be allocated to the terminal j and $X_j$ is the number of time slots requested by terminal j, $Y_j$ is the minimum number of time slots that should be allocated to terminal j. $X_{ij}$ is a decision variable, which has a value of 1 when a time slot i is allocated to a terminal j and has a value of 0 otherwise. $V_j$ is a penalty coefficient (penalty weight). The penalty coefficient is decided according various factors such as delay of the residual packets on the transmission queue of each terminal (RCST). That is, a large value is assigned for the penalty coefficient to the terminal (RCST) when the terminal contains a lot of delayed data. As a result, fairness of allocation resources can be achieved.

Referring to Eq. 1, g(x) is the total penalty caused by the timeslot allocation denoted by matrix $[x_{ij}]$. There are several conditions. At first, the number of time slot for allocating to each terminal must be less than a upper bound (threshold value) or request number, which is decided by system parameters such as construction of the super-frame. Secondly, the number of time slots for allocating to each terminal must be greater than lower bound, which is decided for satisfying service quality. Lastly, each time slot cannot be allocated to two and more terminals.

Eq. 1 can be modified to following Eq. 2 for effectively solving a problem of resource allocation based on a concept of frame pair in accordance with the present invention. The capacity allocation problem (CA)) can be mathematically formulated as follows:

(CAP)

$$\text{MINIMIZE } g_1(x) = \sum_{j \in R} v_i \sum_{m \in A} \sum_{i \in S} (1 - x_{ij})$$

subject to $$\sum_{m \in A} \sum_{j \in s_{m,1}} x_{ij} \leq \min\{Q_j, X_j + Y_i\}, j \in R \quad \text{Eq. 2}$$

$$\sum_{m \in A} \sum_{j \in s_{m,1}} x_{ij} \geq Y_j, j \in R$$

$$\sum_{j \in R} x_{ji} \leq 1, j \in S_m, m \in A$$

$$x_{ji} \in \{0, 1\}$$

A difference between Eq. 1 and Eq. 2 is that the number of objects for allocation schedule is a total number of slots in a frame pair and a total number of slots in a superframe, therefore, the processing time may be decreased since the size of problem (CAP) and the complexity required to solve problem (CAP) are decreased. Furthermore, if the allocation schedule of the first frame pair is copied and used for remained frame pairs, the allocation schedule for time slots in the super-frame can be effectively and rapidly made.

In Eq. 2, $S_{m,1}$ is a set of available time slots included in the first superframe. The original problem (CAP) is divided to n sub-problems and optimize x. As a result, $$g(x) = \sum_{m=1}^{n} g_n(x)$$

at the optimal solution x.

Eq. 2 requires a preprocess of solving an allocation decision amount.

A problem of deciding an amount of allocation $v_j$ is a weight representing how a terminal j is important comparing to other terminal. The weight can be decided according to a service quality. For example, resources are effectively and rapidly allocated to the terminals by assigning higher priority to a terminal, which have been delayed to be allocated of resources for long period time.

$$\text{MINIMIZE } f(x) = \sum_{j \in R} v_j z_j$$

Subject to $$Z_j \leq \min\{Q_j, X_j + Y_j\}, j \in R \quad \text{Eq. 3}$$

$$Z_j \geq Y_j, j \in R$$

$$\sum_{j \in R}^{j} z_j \leq \sum_{m \in A} S_{m,1}$$

$$Z_j \in Z \cup \{0\}$$

Referring to Eq. 3, $Z_j$ is a decision variable denoting the number of time slot allocated to the terminal j.

f(z) denotes a total penalty according to the amount of allocation denoted by vector z. There are limitation conditions as followings. At first, an amount of allocation of each terminal must be less a given upper bound and request amount. Secondly, the amount of allocation of each terminal must be greater than a given lower bound and lastly, the total amount of allocation must be less than available amount of resource.

A problem for deciding an amount of allocation is shown in below.

Step 1 (Sort $[v_j]$)     Eq. 4

$k := 1, J_{k-1} = \{\}$

For(; $k <= |R|; k++$){

$j_k := \text{argmax}\{v_j, j \in R - J_{k-1}\}$

$J_k := J_{k-1} \cup \{j_k\}$

}

-continued

Step 2 (Find an optimal $y^*$)

$$n := \max\left\{n \;\middle|\; \sum_{k=1}^{n} yjk \leq \sum_{m \in A} |S_m| - \sum_{j \in R} Y_j\right\}$$

if $n = |R|$, then $y_j := \min\{Q_j - Y_j, X_j\}$ for $j \in R$

Else $y_j^* := \min\{Q_j - Y_j, X_j\}$ for $j \in J_n$ $y_m + 1 := \sum_{m \in A} |Sm| - \sum_{j \in R} Yj - \sum_{j \in J_m} \min\{Q_j - Y_j, X_j\}$ Step 3 (Find an Optimal $Z^*$)

$Z^* := y^* + [Y_j]$

In a Step 1, $V_j$ is sorted from one having large weight to one having small weight. In here, $j_k$ is an ID of a terminal having $k^{th}$ largest penalty weight ($V_j$). $J_k$ is a set having $\{j_1, \ldots, j_k\}$.

In the Step 2, additional allocation amount is optimally decided. At n:=max{ ... }, the additional allocation amount is the number of variable timeslots $\Sigma x_{jk}$. If an amount of remained resource is sufficient, additional requested resource is maximally allocated and if the amount of remained resource is not sufficient, additional requested resource is maximally allocated to a terminal $J_n$ having a highest priority at first and then remained resource is allocated to other terminals.

Step 3 is a step of deciding total allocation amount. The total allocation amount is a sum of basic allocation amount and additional allocation amount and it is computed for each terminal.

Referring to Eq. 4, a step 304 for deciding optimal resource allocation amount is explained in below.

At first, it is sorted from one having a higher weight and one having a lower weight. At this time, the highest weight has an index $j_1$ and stored in a set $J_1$. Similarity, the $k^{th}$ highest weight has an index $j_k$ and stored in a set $J_k$.

After then, an additional allocation amount $y^*_j$ excepting minimum allocation amount is decided at step 2. At step 3, a total allocation amount $z^*_j$ is calculated by adding the decided additional allocation amount and the optimal allocation amount. In here, $y^* = [y^*_j]$, and $z^* = [z^*_j]$.

In other hand, below equation 5 shows a step 305 for deciding a time slot to be allocated to each of terminals RCST based on the optimal allocation vector $z^*$. That is, it is a step for choosing time slot to be allocated to each of terminals based on the decided allocation amount $[z^*_j]$.

Step 1: Initialization     Eq. 5 slot_count := 0, $x := 0$

Step 2 (Iteration)

For ($k := 1, k <= |R|; k++$){

For ($i := \text{slot\_counter}; i < +j_k; i++$){

$xi, jk := 1$;

} slot_counter += $z_{jk}$.

}

Referring to Eq. 5, a slot i is allocated to a terminal $j_k$, $x_i$ and $j_k$ are set as 1. That is, the i is increased as many as the number of allocation and $x_i$ and $j_k$ are set as 1, therefore, an amount of allocation to the terminal $j_k$ is $z^*_j$.

In Eq. 5, objective time slots are all of time slots in a first frame pair. The time slot is allocated from one having lowest frequency (carrier) to a direction of time increase. The above mentioned step is repeated for next carrier.

A schedule of frame pair generated in steps of 304 and 305 is copied to remained frame pairs at step of 306. Therefore, allocation schedule for all time slots included in the super-frame is completed.

As mentioned above, a reason of computing the optimal allocation amount is since values of objective equation are not changed if it is moved to any directions.

FIGS. 5A to 5D shows a simulation result of the preferred embodiment of the present invention for verifying an effectiveness of the present invention. For running simulation of the present invention, a personal computer with Pentium III 1.0 GHz is used. The simulation uses a model network having 128 terminals and 65024 time slots under conditions that all weights are 1, a minimum allocation amount is 6 per a frame, a maximum allocation amount is 508 per a frame. The simulation is progressed by randomly generating a request resource amount and measuring a time solving two problems of the request resource amount.

A program used for simulation has already used at a real-time resource manager in a host station Hub 13 and it includes a time for expressing a resource allocation schedule as a type of messaging between units of the real system. According to the result of the simulation, it maximally takes a time of 10 ms for deciding an allocation amount and also maximally takes a time of 30 ms for selecting a time slot. It also takes 500 ms for requesting resource of the terminal RCST 11 to a main station Hub 13, completing an allocation schedule and the allocation schedule is passed to the terminal RCST 11 again. Although a length of superframe is a range of 2000~92000 ms (a standard of DVB-RCS), it is clearly shows that a processing speed of the present invention is very fast comparing to prior art.

The above-mentioned method according to the present invention can be implemented as instructions and stored to a computer readable recoding medium such as a CD-ROM, RAM, floppy disk, hard disk and optical magnetic disk.

As mentioned above, the present invention can output resource allocation schedule in order to have a maximum throughput in a timeslot allocation in a return link based on MF-TDMA of interactive multimedia network by a problem division method using a frame pair.

While the present invention has been described with respect to certain preferred embodiments, it will be apparent to those skilled in the art that various changes and modifications may be made without departing from the scope of the invention as defined in the following claims.

What is claimed is:

1. An apparatus for dynamically allocating resource in an interactive satellite multimedia system, comprising:
    resource request amount collection means for accumulating a requested resource amount corresponding to each of terminals during a super-frame period;
    resource request amount processing means for dividing an accumulated requested resource amount by the number of frame pairs in a super frame and storing a sum of a result of dividing and rounding up a remain of the division to a nearest integer as a request amount of each corresponding terminal; and
    resource allocation means for deciding a time slot allocated at each of terminals corresponding to a frame pair based on optimal allocation amount, which is decided based on the request amount by the requested amount processing means.

2. The apparatus as recited in claim 1, wherein the resource allocation means completes a time slot allocation schedule for a first frame pair based on an optimal allocation resource amount by deciding how to allocate resource to each of terminals and the time slot allocation schedule is copied for other frame pairs.

3. The apparatus as recited in claim 1, wherein the resource allocation means includes:
    resource allocation amount deciding means for deciding an amount of resource allocated to each of terminals;
    resource allocation scheduling means for deciding terminals to be allocated of variable time slot included in a first frame pair based on the amount of resource decided by the resource allocation amount deciding means; and
    resource allocation schedule copying means for copying an allocation schedule of time slot in the first frame pair for remained frame pairs in same super-frame.

4. The apparatus as recited in claim 3, wherein the frame pair is a subset of the super-frame, one of frame pairs is a set of frames or a frame having identical time period, each of frame pairs have identical a time slot allocation type or a frequency bandwidth and different time period comparing to other frame pairs, all frame pairs in one super-frame are subsets and a union of all frame pairs is the super-frame.

5. The apparatus as recited in claim 4, wherein the resource request amount processing means obtains a result computed by dividing the request resource amount of each terminal by the number of frame pairs in one super-frame and rounding off a result of division to the nearest integer.

6. A method for dynamically allocating resources in an interactive satellite multimedia system, comprising the steps of:
    a) accumulating a request amount of resource corresponding to each of terminals during a super-frame period;
    b) dividing the accumulated request amount of resource by frame pairs included in one super frame and remembering a sum of a result of dividing and rounding off a remain of the division to a nearest integer as a resource request amount; and
    c) deciding an optimal allocation amount based on the resource request amount and deciding a time slot to be allocated to each of terminals based on the optimal allocation amount.

7. The method as recited in claim 6, wherein in the step c), a time slot allocation schedule of a first frame pair is decided based on the optimal allocation amount by deciding the optimal allocation amount based on the resource request amount in the step b) and the time slot allocation schedule of the first frame pair is copied and used for other frame pairs.

8. The method as recited in claim 6, wherein the step c) includes the steps of:
    d) deciding how much resource is allocated to each of terminals based on the first frame pair;
    e) deciding terminals to be allocated of a variable time slot included in the first frame pair base on the optimal allocation amount; and
    f) copying a time slot allocation schedule of the first time slot to remained frame pair in the same super frame.

9. The method as recited in the claim 8, wherein in the step d), the optimal allocation amount is decided according to a priority of resource request amount processed at the step b), an additional allocation amount excepting minimum allocation amount is decided by sorting the resource request amounts from one having higher weight to one having lower weight and a total allocation amount is calculated by adding the additional allocation amount and the optimal allocation amount.

10. The method as recited in the claim 6, wherein in the step b), a result is obtained by dividing the request resource amount of each terminal by the number of frame pairs in one super-frame and rounding off a result of division to the nearest integer.

11. A computer readable recording medium storing instructions for executing a method for actively allocation resource in two-way satellite multimedia system, comprising functions of:

a) accumulating a request amount of resource corresponding to each of terminals during a super-frame period;

b) dividing the accumulated request amount of resource by frame pairs included in one super frame and remembering a sum of a result of dividing and rounding off a remain of the division to a nearest integer as a resource request amount; and c) deciding an optimal allocation amount based on the resource request amount and deciding a time slot to be allocated to each of terminals based on the optimal allocation amount.

* * * * *